May 5, 1970  R. J. ANDERSON  3,510,081
DRAFTING BOARD WITH SHEET FEED CONTROL
Filed Jan. 18, 1968  2 Sheets-Sheet 1
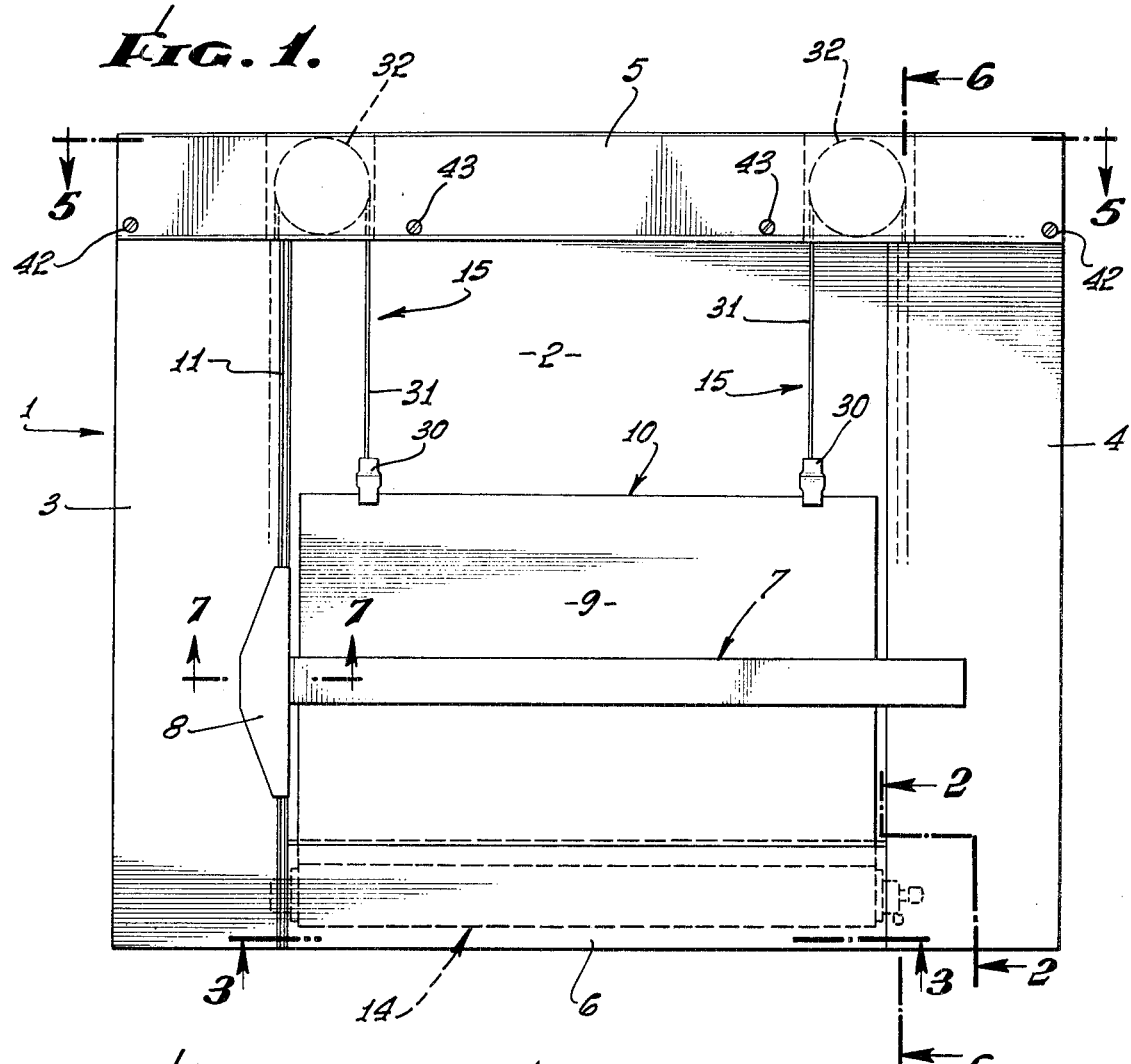
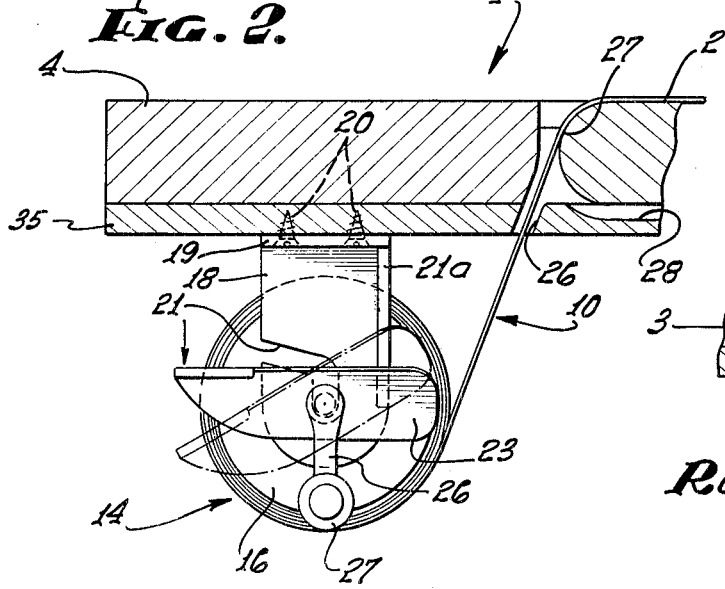
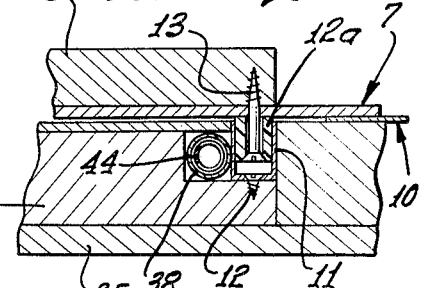
INVENTOR
ROY J. ANDERSON
By Bernard Kriegel
ATTORNEY.

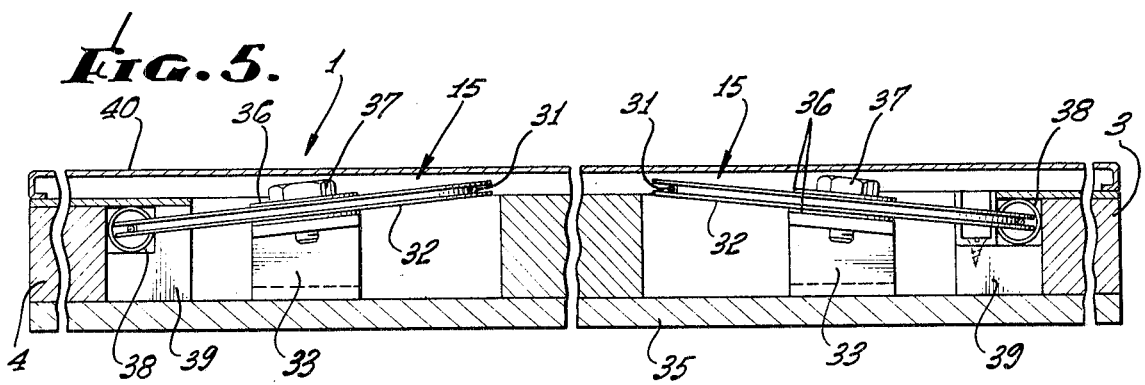
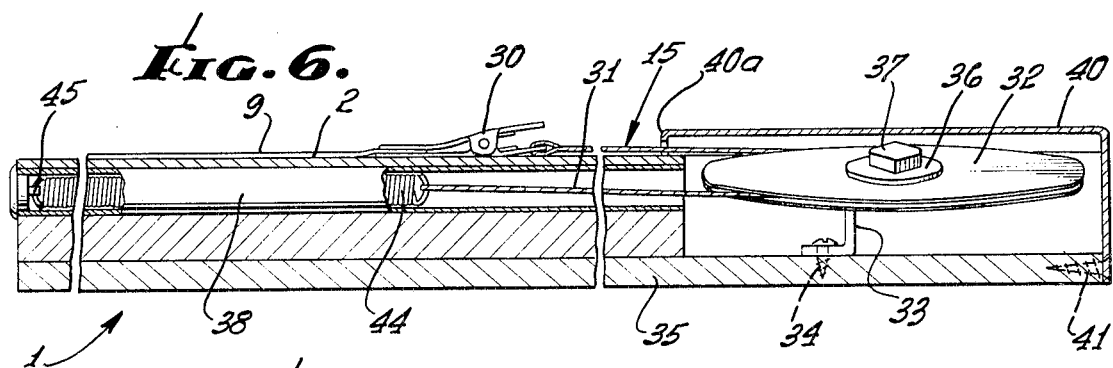
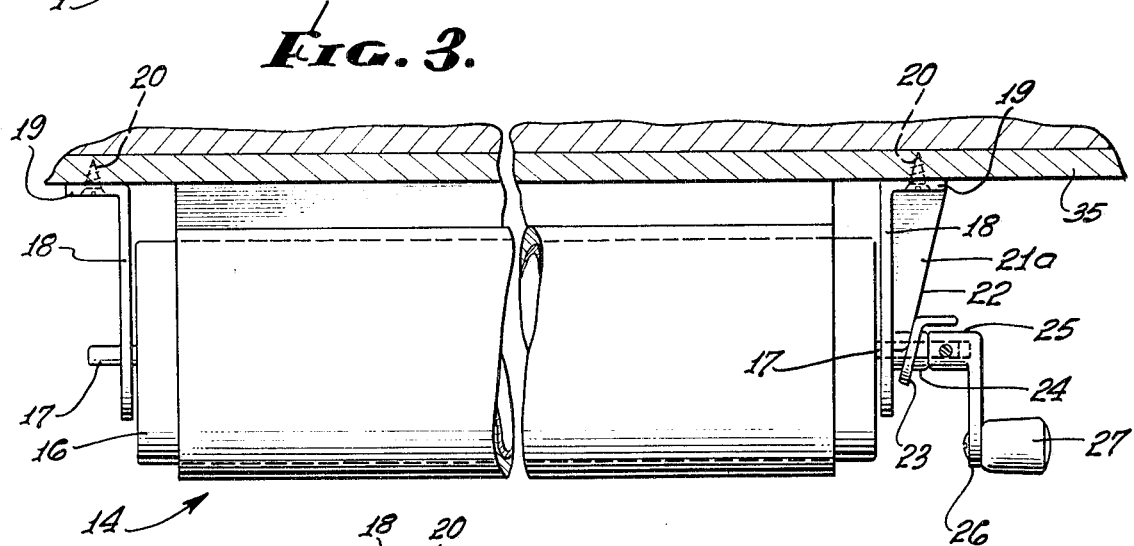
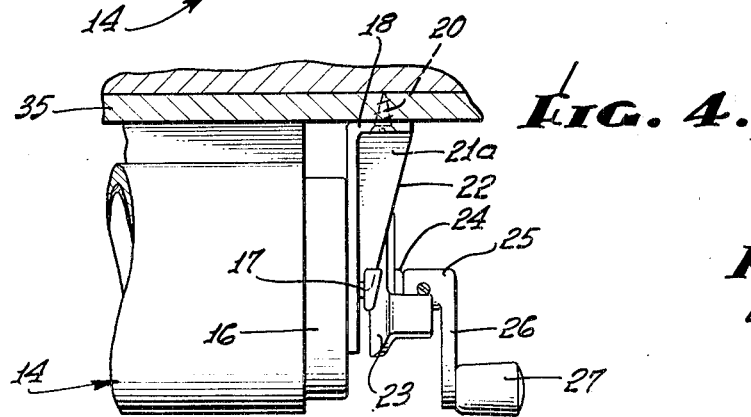

United States Patent Office 3,510,081
Patented May 5, 1970

3,510,081
DRAFTING BOARD WITH SHEET FEED CONTROL
Roy J. Anderson, 1220 Crenshaw Blvd., Los Angeles, Calif. 90019
Filed Jan. 18, 1968, Ser. No. 698,749
Int. Cl. B65h 17/02
U.S. Cl. 242—67.1                                    14 Claims

ABSTRACT OF THE DISCLOSURE

A drafting board having a work sheet feed control in which a length of work sheet supported on a roll may be controllably allowed to move lengthwise under the influence of spring-loaded work sheet tensioning means, and means are also provided for retracting the work sheet.

---

Drafting or drawing tables have heretofore been devised which have had a storage space for maintaining portions of a drawing work sheet in protected and out-of-the-way locations as a particular but limited work surface area is exposed for drawing, the work sheet being movable endwise to allow different work surface areas to be exposed as may be desired or expedient. These tables have not been altogether satisfactory, however, particularly in respect of simply controlling the feed of the work sheet without causing undue creasing of the work sheet when it remains stationary for a length of time, as during the period when drawing work is being done on a limited area of the sheet, or when the table is idle and no drawing work is being accomplished.

Accordingly, a general object of the invention is to provide a drawing or drafting board which avoids the above-noted deficiencies, as well as other deficiencies in drawing boards of the general type here involved, including simple drawing boards, as well as more complex drawing or drafting tables.

A more specific object of the invention is to provide a drawing board which enables the controlled feed of the work sheet from a supply roll, as well as the rewinding of the work sheet on the roll, so that a selected work surface area may be easily and conveniently located on the drawing board for facilitating drawing on a particular work surface area.

Another and related object of the invention is to provide a drafting board which not only facilitates the movement of a desired work surface area to a desired location on the drawing board, but which also maintains the work surface portion of the sheet in a fixed, taut condition, so as to assure accuracy of drawing, notwithstanding that the sheet may be moved from time to time as the drawing progresses.

Still another object of the invention is to provide a drawing board having a supply roll of paper thereon, and tensioning means normally tending to move the paper in one direction, the roll being controllable by a brake means, whereby movement of the paper in said one direction along the drawing board requires simply the release of the brake means, but the roll being rewindable to allow movement of the paper in the other direction.

A further object of the invention is to provide a drafting board of the character described, which is relatively simple in construction, economical to manufacture, and otherwise ideally suited to its intended purposes.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 1 is a plan view of a drafting board embodying the invention;

FIG. 2 is an enlarged fragmentary section taken along the line 2—2 of FIG. 1;

FIG. 3 is an enlarged section taken along the line 3—3 of FIG. 1;

FIG. 4 is a fragmentary detail view in elevation showing the paper roll brake means engaged to prevent movement of the paper along the drafting board;

FIG. 5 is an enlarged section taken along the line 5—5 of FIG. 1;

FIG. 6 is an enlarged section taken along the line 6—6 of FIG. 1; and

FIG. 7 is an enlarged section taken along the line 7—7 of FIG. 1.

Referring first to FIG. 1, the invention will be seen to include a drafting board 1, which may be a simple drafting board or which may be made as a part of a more comprehensive drafting table assembly. The drafting board 1 includes a work surface area 2 centrally thereof between a pair of parallel side frame members 3 and 4, and an upper end member 5 which is parallel to a lower end member 6. The side members 3 and 4 and end members 5 and 6 are suitably interconnected together to provide a generally rectangular board assembly. A T-square 7 has a head 8 adapted to slidably move along the work surface 2, and, as is customary, assist in the making of a drawing on a work surface area 9 of a work sheet of paper 10.

As seen in FIGS. 1 and 7, the T-square head 8 is adapted to move along a line which is parallel to the side members 3 and 4 of the drawing board 1. Accordingly, a channel 11 is provided intermediate the side 3 and the work surface 2 of the board, the channel preferably being composed of a metallic rail fastened, as by fasteners 12, to the side 3 and providing a guide for a member 12a secured, as by fasteners 13, to the underside of the head 8 of the T-square 7.

Work sheet roll means 14 are provided beneath the lower end 6 of the board 1, and work sheet tensioning means 15, 15 are provided for normally holding the work surface area 9 of the work sheet 10 in tensioned relation on top of the drawing board work surface 2.

Referring to FIGS. 2, 3 and 4, the work sheet roll means 14 will be seen to comprise a roll 16 having at its opposite ends a pair of axles 17 which extend through downwardly projecting supporting brackets 18, the brackets allowing a certain freedom of longitudinal movement of the roll 16 for a purpose which will hereinafter more fully appear. Each bracket 18 is generally L-shaped, having a foot 19 secured, as by fasteners 20, to the undersurface of the table 1, and, as best seen in FIG. 2, each of the brackets is provided with a slot 21 adapted to accommodate the respective axles 17, whereby drawing paper rolls may be removably supported by the brackets 18.

One of the brackets 18 and one of the axles 17 are provided with cooperative means for applying a braking force to the roll 16 so that the same will be held against rotation, while a sheet of drawing paper is held in tension by the tensioning means 15 previously referred to. In the embodiment of the invention herein disclosed, the brake means comprises a wall 21a provided on the right hand bracket 18, as shown in the present drawings, this wall providing a wedge surface 22 extending downwardly at an angle and engageable by one end of a lever 23. This lever 23 is provided on a hub 24 which is revolvably disposed on the axle 17 so as to allow pivotal movement of the lever 23 between the full line and broken line positions illustrated in FIG. 2. Pivotal movement of the lever 23 from the full line position to the broken line position is adapted to cause axial or longitudinal movement of the roll 16 from the position shown in FIG. 3 to the position shown in FIG. 4, at which latter position the end of the roll is frictionally engaged with the opposing face of the adjacent bracket 18. Such axial movement of the roll 16 is caused by the wedge action of the surface 22 acting on the lever 23 and tending to cause axial movement of the lever supporting hub 24. The hub 24 is engaged with a member fixed on the axle 17, and, in the illustrative embodiment, this member constitutes the mounting end 25 of a crank 26 having a handle 27, whereby the roll 16 is adapted to be manually rotated. It will be appreciated that the crank 26 may, if desired, be at the opposite end of the roll 16 from the brake means, and any other suitable stop means may be provided on the axle 17 to cause axial movement of the roll 16 in response to pivotal movement of the lever 23.

As best seen in FIG. 2, the drawing or work sheet 10 passes from the roll 16 upwardly through a passage 26, which extends transversely of the table 1, and is of sufficient width to allow free passage of the sheet 10 therethrough. The work surface 2 of the table 1, moreover, is provided with an arched or curved surface 27 engaged by the paper sheet 10 as it passes through the slot 26 onto the top of the work table, so that at no region in the entire run of work sheet from the roll to the tensioning means 15 is there induced any creasing or sharp folding of the paper material.

In some instances, it may be desirable to employ tracing paper on the roll 16 and to be able to lay the tracing paper over a previously completed drawing. Accordingly, the drawing board 1 may be provided with a subway 28, a portion of which is seen in FIG. 2, providing a course through which the finished drawing may be fed in underlying relation to the tracing paper supplied from the roll 16, the composite tracing and drawing papers in such a case being both engaged by the tensioning means 15, so that, when it is desired to allow the composite sheets to be moved longitudinally by the tensioning means 15, it is only necessary to release the lever 23, thereby releasing the braking action which holds the roll 16 fixed, and the tensioning means 15 will effect feed of the composite sheets to a desired new location.

The tensioning means 15 are best illustrated in FIGS. 1, 5 and 6 as comprising a pair of spring-loaded clamps 30 adapted to grip the work sheet 10 at its upper edge and at transversely spaced locations so as to apply an equalized pull to the sheet. Each clamp 30 is connected to a flexible line or cable 31 which extends upwardly and about a pulley 32, the line or cable 31 then extending towards the lower end of the drawing board and being connected to one end of a coiled tension spring 44, the other end of which is anchored at 45, as clearly illustrated in FIG. 6. Each of the pulleys 32 is supported for rotation on a bracket 33 supported, as by screws 34, on a base plate 35 on the drawing board 1, each pulley being revolvable between a pair of washers 36 and being connected to the respective brackets 33 by a bolt 37. The pulleys 32 are inclined at an angle such that one end of the cable or line 31 in each case will be aligned with a tube 38 which is provided in a longitudinally extended frame member 39 at opposite sides of the work surface 2 of the drawing board, the coiled springs 32 being disposed within the respective tubes 38.

In addition, the pulleys are so disposed that the other ends of the cables or lines, which are connected to the clamps 30, lead from the respective pulleys 32 in a plane slightly above the plane of the work surface 2 so that the lines or cables 31 are not caused to drag over any corners causing undue wear and friction. Preferably, the pulleys 32 and the supporting portion of the bottom board plate 35 are covered by a housing or cover 40 suitably secured along the upper end of the plate 35, as by fasteners 41, and to the sides 3 and 4 of the board, as by fasteners 42, as well as to the upper end of the board, as by fasteners 43, the cover 40 having an inner margin 40a spaced upwardly from the work surface 2 to provide a clearance space for the passage of the cables or lines 31.

From the foregoing, it will now be apparent that, in use, the sheet of drawing or other paper 10 on a roll 16 may be applied to the brackets 18, and the free edge of the paper fed upwardly through the transverse slot 26 so as to be presented to the work surface 2 of the board 1. The edge of the work sheet is then engaged by the clamps 30, which are normally biased by the coil springs 32 in tubes 38 to a position adjacent to the upper end 5 of the board. When the brake lever 23 is positioned so as to force the roll 16 endwise into braking engagement with the bracket 18, as shown in FIG. 4, the tensioning means 15 will therefore apply a tensioning force to the work surface area 9 of the sheet 10, holding the same flat and taut on the work surface 2 of the board 1. The T-square 7 facilitates the making of the desired drawings or other work on the exposed area 9 of the work sheet 10. When it is desired to expose a further surface area of the sheet 10, it is only necessary to raise the lever 23 to the full line position shown in FIG. 2, thereby releasing the brake means so that the tensioning means 15 will cause movement of the work sheet 10 until a subsequent downward force is applied to the lever 23, as indicated by the arrow in FIG. 2, whereby to reengage the brake means. When it is desired to roll the work sheet 10 in the reverse direction against the force exerted thereon by the tensioning means 15, the brake means may be released and the crank 26 revolved in a clockwise direction, as viewed in FIG. 2, to rewind a portion or all of the work sheet 10 upon the roll 16.

I claim:

1. A drafting or drawing board comprising: a board having a work surface for supporting a work sheet, a slot in said board extending transversely thereof adjacent an end of said board for the passage of a work sheet from beneath said board onto said work surface, whereby said work sheet may be fed longitudinally along said work surface to position a selected work area of said work sheet at a working position on said work surface, tension means connectible to an edge of said work sheet for causing such longitudinal movement in one direction, said tension means comprising resilient means extending under said board and along and adjacent to the sides of the work surface of said board, and sheet feed control means for allowing the feed of a selected length of work sheet through said slot in response to said tensioning means.

2. A drafting or drawing board as defined in claim 1; wherein said sheet feed control means is located beneath said board adjacent said slot and said board has an arcuate paper guide surface merging with said work surface to prevent creasing of said work sheet.

3. A drafting or drawing board as defined in claim 1; wherein said sheet feed control means comprises means for supporting a work sheet supply roll for rotative movement, and means for applying a braking action to said supply roll to hold the same against rotation in response to the application of said tension means to said work sheet.

4. A drafting or drawing board as defined in claim 1; wherein said sheet feed control means comprises means for supporting a work sheet supply roll for rotative movement, and means for applying a braking action to said supply roll to hold the same against rotation in response to the application of said tension means to said work sheet, and means for rewinding said roll against said tension means.

5. A drafting or drawing board comprising: a board having a work surface for supporting a work sheet, a slot in said board extending transversely thereof adjacent an end of said board for the passage of a work sheet from beneath said board onto said work surface, whereby said work sheet may be fed longitudinally along said work surface to position a selected work area of said work sheet at a working position on said work surface, tension means connectible to an edge of said work sheet for causing such longitudinal movement in one direction, and sheet feed control means for allowing the feed of a selected length of work sheet through said slot in response to said tensioning means; wherein said sheet feed control means comprises a pair of transversely spaced work sheet roll supports beneath said table adjacent said slot and having means for removably engaging axles on a work sheet supply roll, and means cooperable with one of said supports and engageable with one of said roll axles for moving said roll into frictional engagement with one of said supports.

6. A drafting or drawing board comprising: a board having a work surface for supporting a work sheet, a slot in said board extending transversely thereof adjacent an end of said board for the passage of a work sheet from beneath said board onto said work surface, whereby said work sheet may be fed longitudinally along said work surface to position a selected work area of said work sheet at a working position on said work surface, tension means connectible to an edge of said work sheet for causing such longitudinal movement in one direction, and sheet feed control means for allowing the feed of a selected length of work sheet through said slot in response to said tensioning means; wherein said tensioning means comprises clamps engageable with said edge of said work sheet, and resilient means normally biasing said clamps in said one direction.

7. A drafting or drawing board as defined in claim 6; wherein said sheet feed control means comprises support means beneath said table for rotatably supporting a roll of said work sheet and releasable means for preventing rotation of said roll.

8. A drafting or drawing board comprising: a board having a work surface for supporting a work sheet, a slot in said board extending transversely adjacent an end of said board for the passage of a work sheet from beneath said board onto said work surface, transversely spaced work sheet roll supporting means beneath said table adjacent said slot, a roll carried by said support means and having axles at the opposite ends of said roll supported by said support means, one of said axles and one of said support means having cooperative brake means for preventing rotation of said roll, one of said axles having crank means thereon for effecting rotation of said roll when said brake means is released, a work sheet on said roll and having a free end extended through said slot onto said work surface, and tension means connected to said free edge of said work sheet for holding said work sheet taut on said work surface, said tension means comprising resilient means extending under said board and along and adjacent to the sides of the work surface of said board.

9. A drafting or drawing board comprising: a board having a work surface for supporting a work sheet, a slot in said board extending transversely adjacent an end of said board for the passage of a work sheet from beneath said board onto said work surface, transversely spaced work sheet roll supporting means beneath said table adjacent said slot, a roll carried by said support means and having axles at the opposite ends of said roll supported by said support means, one of said axles and one of said support means having cooperative brake means for preventing rotation of said roll, one of said axles having crank means thereon for effecting rotation of said roll when said brake means is released, a work sheet on said roll and having a free end extended through said slot onto said work surface, and tension means connected to said free edge of said work sheet for holding said work sheet taut on said work surface; wherein said brake means comprises a lever pivoted on one of said axles, said lever and one of said supporting means having wedge surfaces for moving said lever and said roll axially.

10. A drafting or drawing board as defined in claim 9; and means fixing said lever on said one of said axles to prevent axial movement of said lever along said axle.

11. A drafting or drawing board as defined in claim 10; wherein said means fixing said lever on said one of said axles comprises said crank means.

12. A drafting or drawing board comprising: a board having a work surface for supporting a work sheet, a slot in said board extending transversely adjacent and end of said board for the passage of a work sheet from beneath said board onto said work surface, transversely spaced work sheet roll supporting means beneath said table adjacent said slot, a roll carried by said support means and having axles at the opposite ends of said roll supported by said support means, one of said axles and one of said support means having cooperative brake means for preventing rotation of said roll, one of said axles having crank means thereon for effecting rotation of said roll when said brake means is released, a work sheet on said roll and having a free end extended through said slot onto said work surface, and tension means connected to said free edge of said work sheet for holding said work sheet taut on said work surface; wherein said tension means comprises clamps connectible to the edge of said work sheet, lines connected to said clamps and extending along the upper surface of said board, pulleys at the upper end of said board disposed at an angle whereby said lines lead into said pulleys in a straight line, and tension spring means below the upper surface of said board and connected to said lines.

13. A drafting or drawing board as defined in claim 12; wherein said drawing board includes a cover at its upper end overlying said pulleys and having an inner margin spaced slightly above said work surface to provide a passage for said lines.

14. A drafting board as defined in claim 12; wherein tubular members are provided in said board beneath said work surface, said tension spring means including coiled springs anchored in said tubular members and connected to said lines.

References Cited

UNITED STATES PATENTS

| | | | |
|---|---|---|---|
| 1,050,605 | 1/1913 | Boland et al. | 33—76 |
| 590,696 | 9/1897 | Batson | 33—80 X |
| 1,208,024 | 12/1916 | Sinclair | 33—95 |
| 1,934,952 | 11/1933 | Shoemaker | 281—6 X |
| 1,942,727 | 1/1934 | O'Farrell | 242—67.1 |
| 2,089,757 | 8/1937 | Nieuwkamp | 33—76 |
| 2,219,766 | 10/1940 | Cotterman | 33—76 |

HARRY N. HAROIAN, Primary Examiner

U.S. Cl. X.R.

33—76